United States Patent
Amurri et al.

(10) Patent No.: US 11,584,100 B2
(45) Date of Patent: Feb. 21, 2023

(54) METHOD AND APPARATUS FOR CONTROLLING THE FEED OF SEMIFINISHED PRODUCTS IN A TYRE BUILDING PROCESS

(71) Applicant: Pirelli Tyre S.p.A., Milan (IT)

(72) Inventors: Cesare Emanuele Amurri, Milan (IT); Nicola Il Grande, Settimo Torinese (IT); Davide Lupo Conti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 30 days.

(21) Appl. No.: 15/763,014

(22) PCT Filed: Sep. 29, 2016

(86) PCT No.: PCT/IB2016/055824
§ 371 (c)(1),
(2) Date: Mar. 23, 2018

(87) PCT Pub. No.: WO2017/056030
PCT Pub. Date: Apr. 6, 2017

(65) Prior Publication Data
US 2019/0084257 A1    Mar. 21, 2019

(30) Foreign Application Priority Data
Sep. 30, 2015 (IT) .................. 102015000056863

(51) Int. Cl.
*B29D 30/30*    (2006.01)
*B65H 26/02*    (2006.01)
(Continued)

(52) U.S. Cl.
CPC .......... *B29D 30/30* (2013.01); *B29D 30/005* (2013.01); *B29D 30/44* (2013.01); *B65H 26/02* (2013.01);
(Continued)

(58) Field of Classification Search
CPC .......... B65H 2801/93; B65H 2511/413; B65H 2301/515; B65H 2408/21; B29D 2030/0066
See application file for complete search history.

(56) References Cited

U.S. PATENT DOCUMENTS

| 4,895,029 A | 1/1990 | Yamada et al. |
| 9,393,751 B2 * | 7/2016 | Hasegawa ........... B29C 65/7847 |

(Continued)

FOREIGN PATENT DOCUMENTS

| CN | 1335817 A | 2/2002 |
| CN | 101678623 A | 3/2010 |

(Continued)

OTHER PUBLICATIONS

ESpaceNetTranlsation of DE10321770A1 (Year: 2019).*

(Continued)

*Primary Examiner* — Robert C Dye
*Assistant Examiner* — Alexander D Booth
(74) *Attorney, Agent, or Firm* — Finnegan, Henderson, Farabow, Garrett & Dunner, L.L.P.

(57) ABSTRACT

Method for controlling the feed of semifinished products in a tyre building process, said method comprising: feeding a semifinished product (10) into a building station (30) adapted to build, through said semifinished product (10), a structural component of a tyre; performing, in an acquisition zone (AZ), a verification to verify the presence of at least one defect of said semifinished product (10); generating a notification signal (NS) as a function of said verification; activating, as a function of said notification signal (NS), a discard device (60), configured for discarding at least one
(Continued)

portion of said semifinished product (10) comprising said at least one defect.

13 Claims, 8 Drawing Sheets

(51) Int. Cl.
*B29D 30/44* (2006.01)
*B29D 30/00* (2006.01)

(52) U.S. Cl.
CPC .......... *B29D 2030/0066* (2013.01); *B29D 2030/3064* (2013.01); *B65H 2301/4127* (2013.01); *B65H 2301/515* (2013.01); *B65H 2408/21* (2013.01); *B65H 2511/413* (2013.01); *B65H 2553/42* (2013.01); *B65H 2801/93* (2013.01)

(56) References Cited

U.S. PATENT DOCUMENTS

| | | | | |
|---|---|---|---|---|
| 2003/0145704 | A1* | 8/2003 | Hoffmann | B65H 35/0006 83/451 |
| 2006/0207716 | A1* | 9/2006 | Schneider | B65H 20/32 156/379 |
| 2010/0170215 | A1* | 7/2010 | Nishimura | D07B 1/0613 57/258 |

FOREIGN PATENT DOCUMENTS

| | | | | |
|---|---|---|---|---|
| CN | 102358454 A | | 2/2012 | |
| CN | 102892574 A | | 1/2013 | |
| DE | 103 21 770 A1 | | 12/2004 | |
| DE | 10321770 A1 | * | 12/2004 | .......... B29C 43/245 |
| JP | H 7-276532 A | | 10/1995 | |
| WO | WO-2009068939 A1 | * | 6/2009 | .......... B29D 30/005 |
| WO | WO 2012/085632 A1 | | 6/2012 | |
| WO | WO-2012085776 A1 | * | 6/2012 | ............ B65H 59/00 |
| WO | WO 2015/092659 A1 | | 6/2015 | |

OTHER PUBLICATIONS

International Search Report form the European Patent Office in corresponding International Application No. PCT/IB2016/055824 dated Feb. 15, 2017.

Written Opinion of the International Searching Authority from the European Patent Office in corresponding International Application No. PCT/IB2016/055824 dated Feb. 15, 2017.

German Patent Application No. DE 103 21 770, "Process and Device for Inspecting Calendered Material Lines", filed May 15, 2003.

* cited by examiner

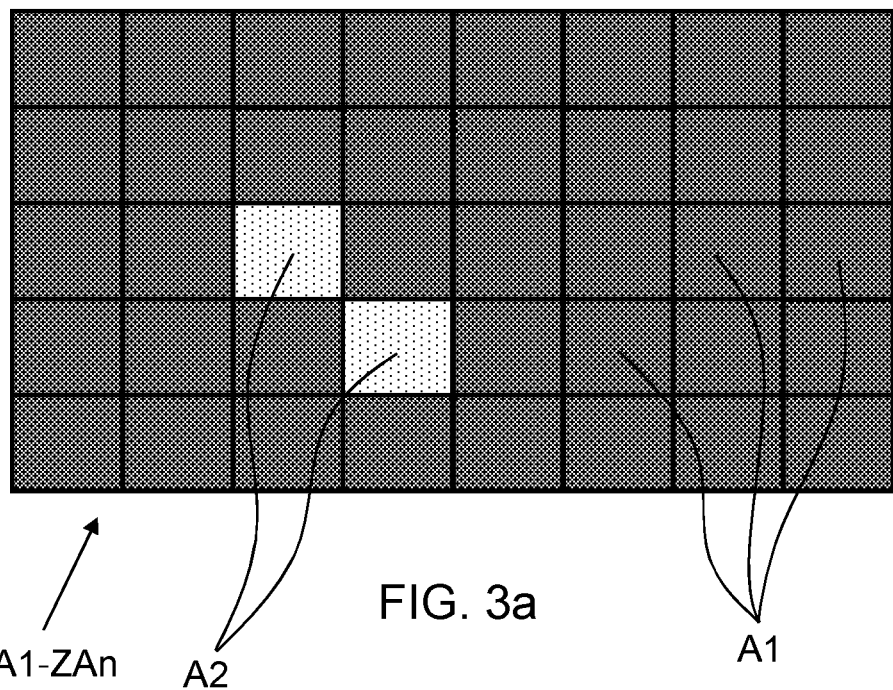
FIG. 3a
A, ZA1-ZAn    A2    A1
FIG. 3b
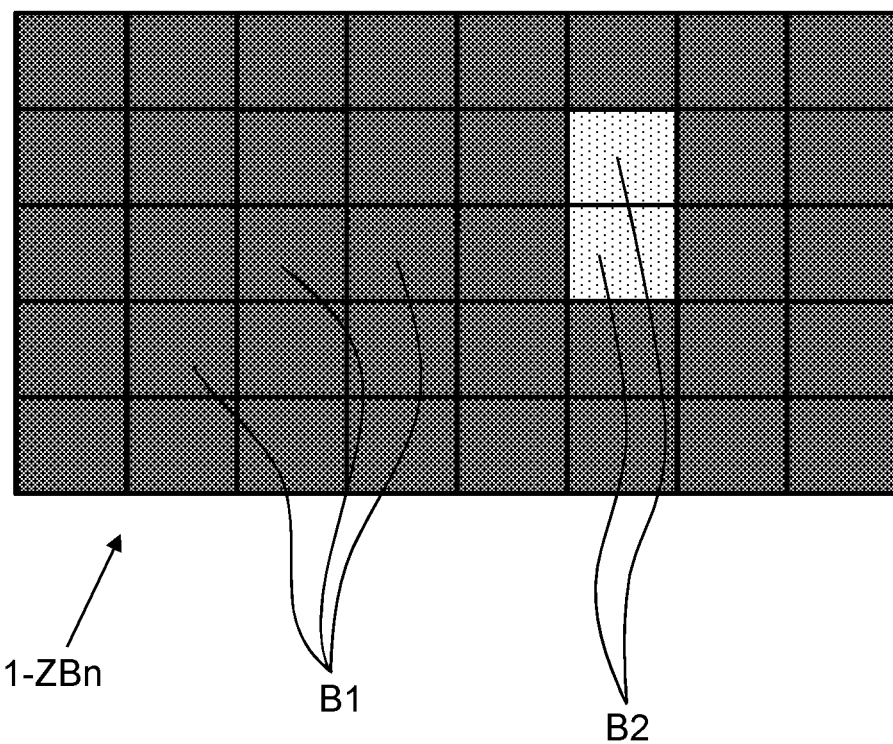
B, ZB1-ZBn    B1    B2

METHOD AND APPARATUS FOR CONTROLLING THE FEED OF SEMIFINISHED PRODUCTS IN A TYRE BUILDING PROCESS

This is a Section 371 application of International Application No. PCT/IB2016/055824, filed on Sep. 29, 2016, which claim priority to Italian Application No. 102015000056863, filed on Sep. 30, 2015, all of which are incorporated herein by reference.

DESCRIPTION

The present invention refers to a method for controlling the feed of semifinished products in a tyre building process.

The present invention also refers to an apparatus for controlling the feed of semifinished products in a tyre building process.

A tyre for vehicle wheels generally comprises a carcass structure comprising at least one carcass ply having respectively opposite end flaps engaged with respective annular anchoring structures, generally called "bead cores", identified in the zones usually indicated with the name "beads", having an internal diameter substantially corresponding to a so-called "fitting diameter" of the tyre for fitting it on a respective mounting rim. The tyre also comprises a crown structure comprising a belt structure having at least one belt strip arranged in a radially outer position with respect to the carcass ply/plies and a tread band which is radially external with respect to the belt strip(s). Between the tread band and the belt strip(s) it is possible to interpose a so-called "underlayer" made of elastomeric material having properties suitable for ensuring a stable union of the belt strip(s) with the tread band itself. On the side surfaces of the carcass structure, each extending from one of the side edges of the tread band up to the respective annular anchoring structure to the beads, respective sidewalls of elastomeric material are also applied. In "tubeless" tyres, the carcass ply is internally coated with a layer of elastomeric material preferably based on butyl, usually called "liner" having optimal characteristics of air tightness and extending from one bead to the other. The term "semifinished product" is meant to indicate a continuous elongated element, made of elastomeric material. Preferably, said continuous elongated element comprises two or more reinforcing cords, preferably textile or metallic, arranged parallel to one another in the longitudinal direction of the elongated element itself.

The term "elementary semifinished product" is meant to indicate a piece of the aforementioned semifinished product cut to size; hereinafter the aforementioned elementary semifinished product is referred to as "strip-like element".

The term "structural component" is meant to indicate any component of the tyre assembled or built in strip form having one or more reinforcing cords (carcass ply/plies, belt strip(s), etc.).

The term "defect" is preferably meant to indicate at least one of:
- a lack of elastomeric material in said semifinished product and/or in said elementary semifinished product, such as to make one or more of said reinforcing cords visible;
- a foreign body present inside said semifinished product and/or in said elementary semifinished product;
- a foreign body present on the outer surface of said semifinished product and/or of said elementary semifinished product.

The term "acquisition zone" is meant to indicate the portion of semifinished product from which characteristic parameters are acquired, through an acquisition device, at a given moment in time. The acquisition device is considered to be substantially immobile over time, and always operating on the same region of space; the semifinished product is considered to be in movement in front of the acquisition device so that, at different moments in time, the acquisition zone comprises different portions of semifinished product. If the acquisition device is an image acquisition device, the acquisition zone is the portion of semifinished product framed, at a given moment in time, by said image acquisition device, and said characteristic parameters define an image that depicts the portion of semifinished product framed.

The term "length of the acquisition zone" is meant to indicate the length, measured along its longitudinal extension, of the part of semifinished product included, at a given moment, in the acquisition zone.

The term "proximal end" of the acquisition zone is meant to indicate the end of the acquisition zone closest to the deposition station in which the semifinished product is cut and deposited on a forming drum.

The term "main length" is meant to indicate the length of the part of semifinished product comprised between the proximal end of the acquisition zone and the point at which said semifinished product is cut in the deposition station, said length being measured along the longitudinal extension of said part of semifinished product.

The term "length" of a strip-like element is meant to indicate the length of a piece of semifinished product cut to size, said length being measured along the longitudinal extension of said piece of semifinished product cut to size.

The term "minimum luminosity value" is meant to indicate, in a black and white detection, the luminosity value that, in a digital detection, is attributed to the pixel of a digital image when substantially no photons hit the corresponding pixel of the detection device used.

In a colour detection, such a minimum luminosity value corresponds to the luminosity value attributed to the sensor or to the sensors (e.g. a set of three sensors) associated with the same pixel, when substantially no photons hit said sensor or each of said sensors. In the case of many sensors associated with the same pixel, each one can for example be dedicated to the detection of a respective fundamental chromatic component of the light hitting such a pixel.

The term "maximum luminosity value" is meant to indicate, in a black and white detection, the luminosity value that, in a digital detection, is attributed to the pixel of a digital image when the maximum number of photons that such a corresponding pixel of the detection device used, i.e. the number of photons capable of saturating the capacity of the sensor itself associated with such a pixel and forming part of said detection device, hits such a corresponding pixel. If a greater number of photons is received, the luminosity value attributed remains equal to said maximum luminosity value.

In a colour detection, such a maximum luminosity value corresponds to the luminosity value attributed to the sensor or to the sensors (e.g. a set of three sensors) associated with the same pixel, when the maximum number of photons that said sensor or each of said sensors is able to receive hits it. In the case of many sensors associated with the same pixel, each one can for example be dedicated to detecting a respective fundamental chromatic component of the light hitting such a pixel.

The strip-like elements, suitably brought together or partially overlapping one another, work towards forming various parts of a tyre, through their deposition on a forming drum preferably having a substantially toroidal or substantially cylindrical shape.

In particular, the strip-like elements can be used to make one or more structural components, like for example one or more carcass plies of the carcass structure and/or one or more belt layers or strips of the belt structure of the tyre.

Document WO2015/092659, to the same Applicant, describes a method and an apparatus for controlling the production and feed of semifinished products in a tyre building process.

Document U.S. Pat. No. 4,895,029 describes a method and an apparatus for detecting imperfections in the joining portion of elastic elements.

The Applicant has observed that, during the course of the unwinding of semifinished products from the reels on which they are wound together with the so-called "service fabric" (film of plastic material, preferably polyester or polyethylene), it may be that portions of service fabric remain associated with the semifinished product, also following the separation of the semifinished product itself from the service fabric, mainly due to the adhesive properties of the compound with which the semifinished product is made.

The Applicant has also observed that the presence of residues of service fabric and/or of adhesive tape on the semifinished product can have extremely negative consequences on the structure, performance and integrity of the tyre, since such residues can prevent correct adhesion between the strip-like elements of one component and/or between different components of the tyre.

In addition to the above, the Applicant has verified that some portions of the semifinished product can be deficient in elastomeric material, such as to make the reinforcing cords visible. Such deficiencies of material can have a very negative impact on the structural characteristics and/or on the performance of the tyre that is possibly made with such defective portions.

The Applicant observes that the control technique described in WO2015/092659 requires that the defect be eliminated manually by an operator, after the plant has been stopped. This has a negative impact on the building time-cycle and causes a reduction in productivity of the plant. The Applicant has also verified that, when a defect is detected, the interruption of the plant is not immediate. This means that the semifinished product continues to run along its path at least for a short part so that, sometimes, the defective portion reaches a pair of rollers used for transmitting/relaying/tensioning the semifinished product itself; the defective portion can thus be hidden from the operator, who may not be capable of eliminating the defect quickly, wasting time looking for it. The Applicant also observes that the control techniques described in U.S. Pat. No. 4,895,029 are dedicated to the detection and analysis of the joints possibly present on the semifinished product, and thus are not suitable for detecting defects like those defined earlier.

The Applicant has thus realised that in order to avoid the problems outlined above it was necessary to combine an automatic discard device with control apparatuses of the strip-like elements (for example of the type described in WO2015/092659) close to the tyre building devices.

In the Applicant's view, said discard device should also have been in line with the building devices to allow automatic functionality thereof such as not to jeopardise the normal operation of the aforementioned building devices, in the absence of defects detected on the strip-like elements themselves.

More precisely, the Applicant has found that a detection station, configured to identify possible defects in the semifinished product can be advantageously provided, upstream of a building station adapted for depositing the semifinished product or the strip-like elements formed from it, so as to send a command signal to a discard device whenever at least one defect is detected, discarding the defective portion of semifinished product.

In accordance with a first aspect, the invention relates to a method for controlling the feed of semifinished products in a tyre building process.

Preferably, provision is made to feed a semifinished product into a building station adapted for building a structural component of a tyre, through said semifinished product.

Preferably, provision is made to carry out, in an acquisition zone, an acquisition to detect characteristic parameters, representative of said semifinished product.

Preferably, provision is made to verify the presence of at least one defect of said semifinished product, as a function of said characteristic parameters.

Preferably, provision is made to generate a notification signal as a function of said verification in the presence of said at least one defect.

Preferably, provision is made to activate a discard device.

Preferably, said discard device is activated as a function of said notification signal.

Preferably, said discard device is configured for discarding at least one portion of said semifinished product comprising said at least one defect.

The Applicant considers that, in this way, it is possible to avoid an increase in the cycle time in the case of defects of the semifinished product, and it is also possible to ensure higher quality of the finished product obtained.

Otherwise, the elimination of the defective portions would be performed by the operator who, as well as needing to plant to be stopped in order to proceed, could take a particularly long time, for example in the case in which the defect is hidden between pairs of transmission/relay/tensioning rollers.

In accordance with a second aspect, the object of the invention is an apparatus for controlling the feed of semifinished products in a tyre building process.

Preferably, a semifinished product is fed into a building station adapted for building a structural component of a tyre, through said semifinished product.

Preferably, a detection station is provided, configured to receive a semifinished product.

Preferably, said detection station is configured to acquire, in an acquisition zone, characteristic parameters, representative of said semifinished product.

Preferably, a processing unit is provided.

Preferably, said processing unit is adapted for detecting the presence of at least one defect of said semifinished product, as a function of said characteristic parameters.

Preferably, said processing unit is adapted for generating a notification signal as a function of the detection of said at least one defect.

Preferably, said processing unit is adapted for activating a discard device.

Preferably, said processing unit is adapted for activating said discard device as a function of said notification signal.

Preferably, said discard device is configured for discarding at least one portion of said semifinished product comprising said at least one defect.

The present invention, in at least one of the aforementioned aspects, can have one or more of the preferred features described hereinafter.

Preferably, said building station is configured for cutting said semifinished product at a given point.

Preferably, the portion of said semifinished product to be discarded is determined as a function of a main length of said semifinished product.

Preferably, said building station is configured for cutting to size said semifinished product.

Preferably, by cutting to size said semifinished product, corresponding strip-like elements of determined length are obtained.

Preferably, the portion of said semifinished product to be discarded comprises one or more strip-like elements identified as a function of said main length.

Preferably, the portion of said semifinished product to be discarded comprises one or more strip-like elements identified as a function of said determined length.

Preferably, the activation of said discard device comprises calculating the integer number defined by the integer part of the result of the division between said main length and said determined length.

Preferably, the activation of said discard device comprises waiting, from when said notification signal is generated, for said building station to lay a number N of strip-like elements equal to said integer number.

Preferably, the activation of said discard device comprises sending a command signal to said discard device to discard at least one strip-like element following said N strip-like elements.

Preferably, said command signal is configured to cause at least the strip-like element immediately following said N strip-like elements to be discarded through said discard device.

Preferably, said command signal is configured to cause the two strip-like elements immediately following said N strip-like elements to be discarded through said discard device.

Preferably, said acquisition zone is interposed between an accumulation station, adapted to accumulate said semifinished product, and said building station.

Preferably, said semifinished product is fed from said accumulation station.

Preferably, acquiring said characteristic parameters comprises detecting a plurality of images representative of said semifinished product.

Preferably, detecting the presence of said at least one defect comprises making a comparison between said images and one or more reference parameters.

Preferably, detecting the presence of said at least one defect comprises generating said notification signal as a function of said comparison.

Preferably, said first image is made up of a plurality of first portions.

Preferably, each first portion is associated with a respective luminosity value.

Preferably, performing said detection comprises defining a first threshold for said luminosity values.

Preferably, performing said detection comprises making a first comparison between the luminosity values of said first portions and said first threshold.

Preferably, performing said detection comprises determining, as a function of said first comparison, a first operative parameter.

Preferably, said first operative parameter is representative of a total area occupied in said first image by the first portions associated with a luminosity value less than or greater than said first threshold.

Preferably, performing said detection comprises making a second comparison between said first operative parameter and a second threshold.

Preferably, performing said detection comprises generating said notification signal as a function of said second comparison.

Preferably, performing said detection comprises dividing said at least one first image into a plurality of first sub-parts.

Preferably, each of said first sub-parts is made up of a plurality of first portions.

Preferably, each first portion is associated with a respective luminosity value.

Preferably, performing said detection comprises defining a first threshold for said luminosity values.

Preferably, performing said detection comprises making a first comparison between the luminosity values of said first portions and said first threshold.

Preferably, performing said detection comprises determining, as a function of said first comparison, for each of said first sub-parts, a first operative parameter.

Preferably, said first operative parameter is representative of a total area occupied in each first sub-part by the first portions associated with a luminosity value less than or greater than said first threshold.

Preferably, performing said detection comprises making a second comparison between each of said first operative parameters and a second threshold.

Preferably, performing said detection comprises generating said notification signal as a function of said second comparison.

Preferably, said detection station is positioned upstream of said building station.

Further characteristics and advantages will become clearer from the detailed description of a preferred but not exclusive embodiment of the invention. Such a description is provided hereinafter with reference to the attached figures, also purely examples and therefore not for limiting purposes, in which:

FIG. 1 schematically shows a part of a tyre building plant in which an apparatus in accordance with the present invention is inserted;

FIGS. 2a-2b, 3a-3b and 4a-4b schematically show example images that can be used in the apparatus and in the method according to the invention;

FIGS. 5a-5b schematically show some elements of the part of plant of FIG. 1, in different operative conditions;

Figure 1:
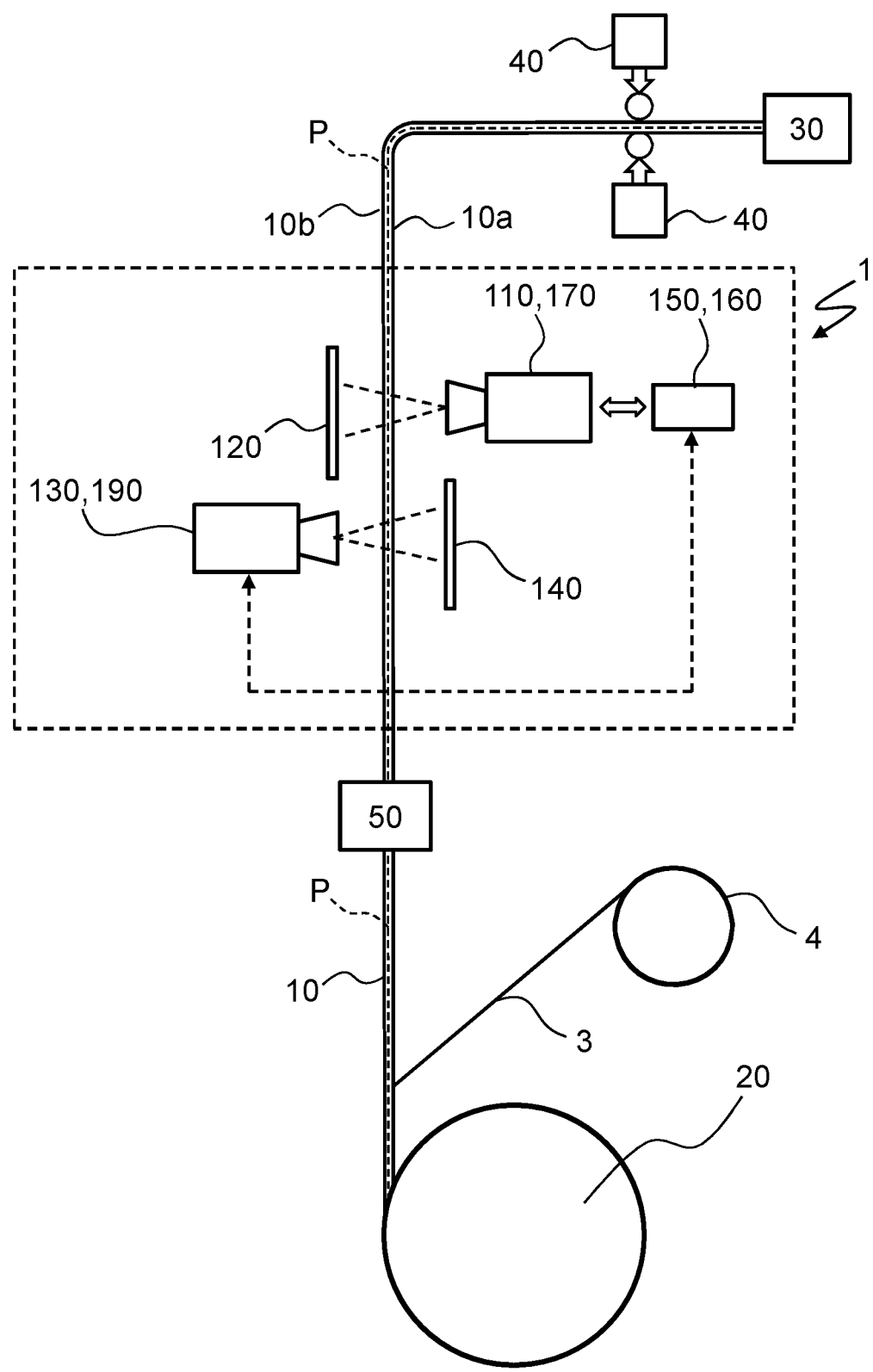
Figure 8A:
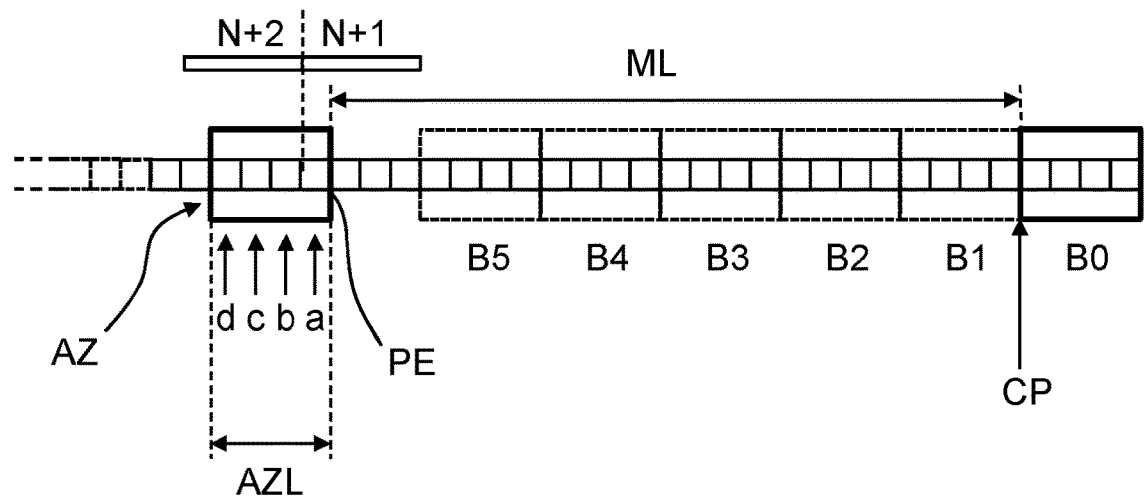
Figure 8B:
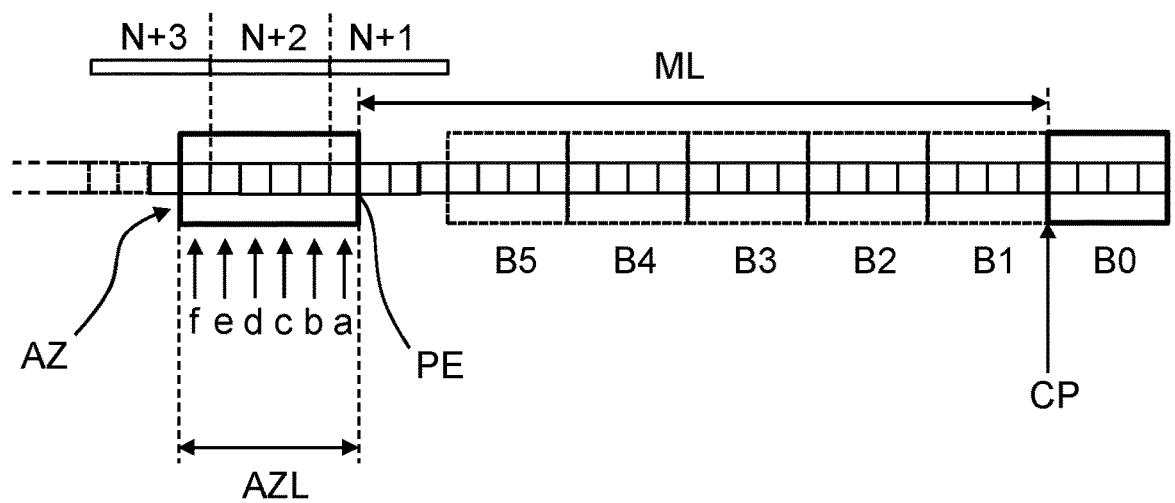

FIGS. 8a-8b schematically show different operative conditions of some elements of the plant of FIG. 1.

With reference to the attached figures, reference numeral 1 wholly indicates an apparatus for controlling the feed of semifinished products in a tyre building process.

As schematically shown in FIG. 1, the apparatus 1 is used to control a semifinished product 10, which is unwound from a reel 20.

On the reel 20 the semifinished product 10 is initially wound together with a service fabric 3; during the unwinding from the reel 20, the semifinished product 10 and the service fabric 3 are separated, in a per se known way. The service fabric 3 is preferably wound onto an auxiliary reel 4.

The semifinished product 10, on the other hand, is suitable moved towards a subsequent building station 30, in which one or more structural components of a tyre are built from said semifinished product 10.

Preferably, the building station 30 is configured for cutting the semifinished product 10 at a given point, for building said one or more structural components.

Preferably, the cutting operation is repeated over time, at different parts of the semifinished product 10. In practice, the semifinished product 10 is provided with substantial continuity to the building station 30, which takes care of cutting a portion thereof at a time, carrying out the cutting operation in said given point. The given point preferably always occupies the same position in space; on the other hand, since the semifinished product is in movement with respect to the building station 30, the cutting operation is carried out, over time, on different parts of the semifinished product 10.

Preferably, the building station 30 is configured for cutting to size the semifinished product 10, obtaining corresponding strip-like elements of determined length DL.

Such strip-like elements are then associated with one another (e.g. brought together and/or at least partially overlapped) on a forming drum 11 to obtain said one or more structural components.

In order to cut the semifinished product 10, the building station 30 is preferably provided with a gripping member 23 and a cutting member 22. The cutting member 22 is suitable for cutting the semifinished product 10 perpendicularly or according to a predetermined inclination with respect to the longitudinal extension of the semifinished product 10 itself, to obtain the single strip-like elements.

The gripping member 23 is mobile between a first work position (FIG. 5a) in which it is suitable for engaging an end of the semifinished product 10 near to the cutting member 22, and a second work position (FIG. 5b) in which it is moved away from the cutting member 22 itself.

Following the translation from the first to the second work position, the gripping member 23 pulls the semifinished product 10 so as to lay it out beyond the cutting member 22 and preferably in a radially adjacent position with respect to the forming drum 11, according to a part of determined length, i.e. corresponding to the length of the strip-like element to be obtained following the subsequent actuation of the cutting member 22.

Figure 5A:
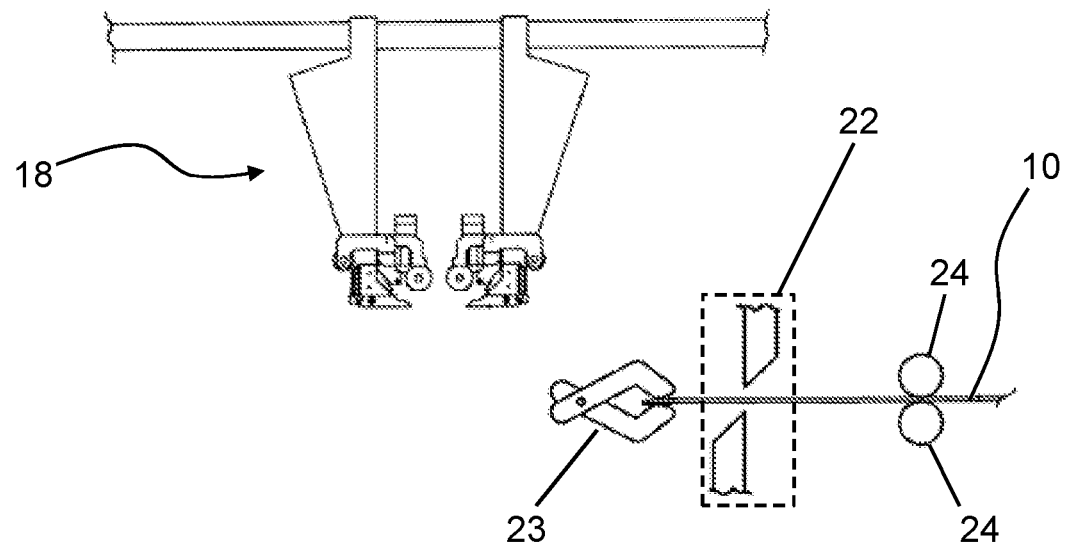
Figure 5A:
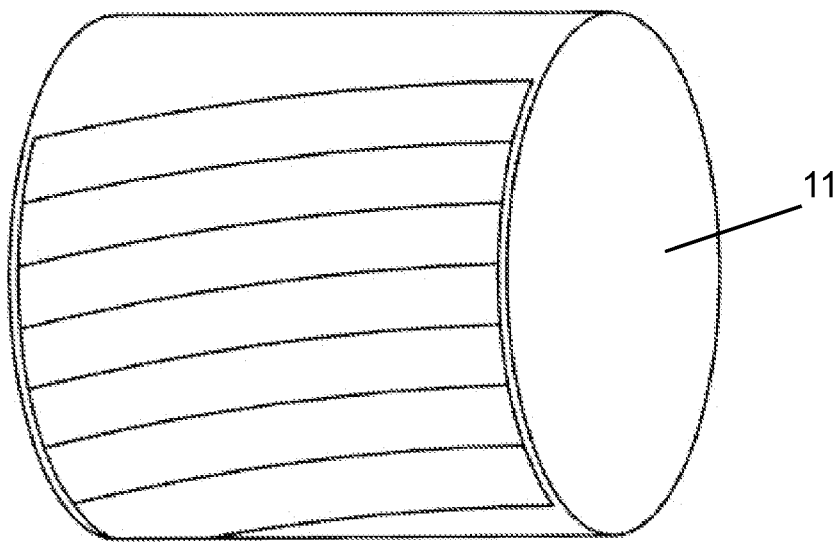
Figure 5B:
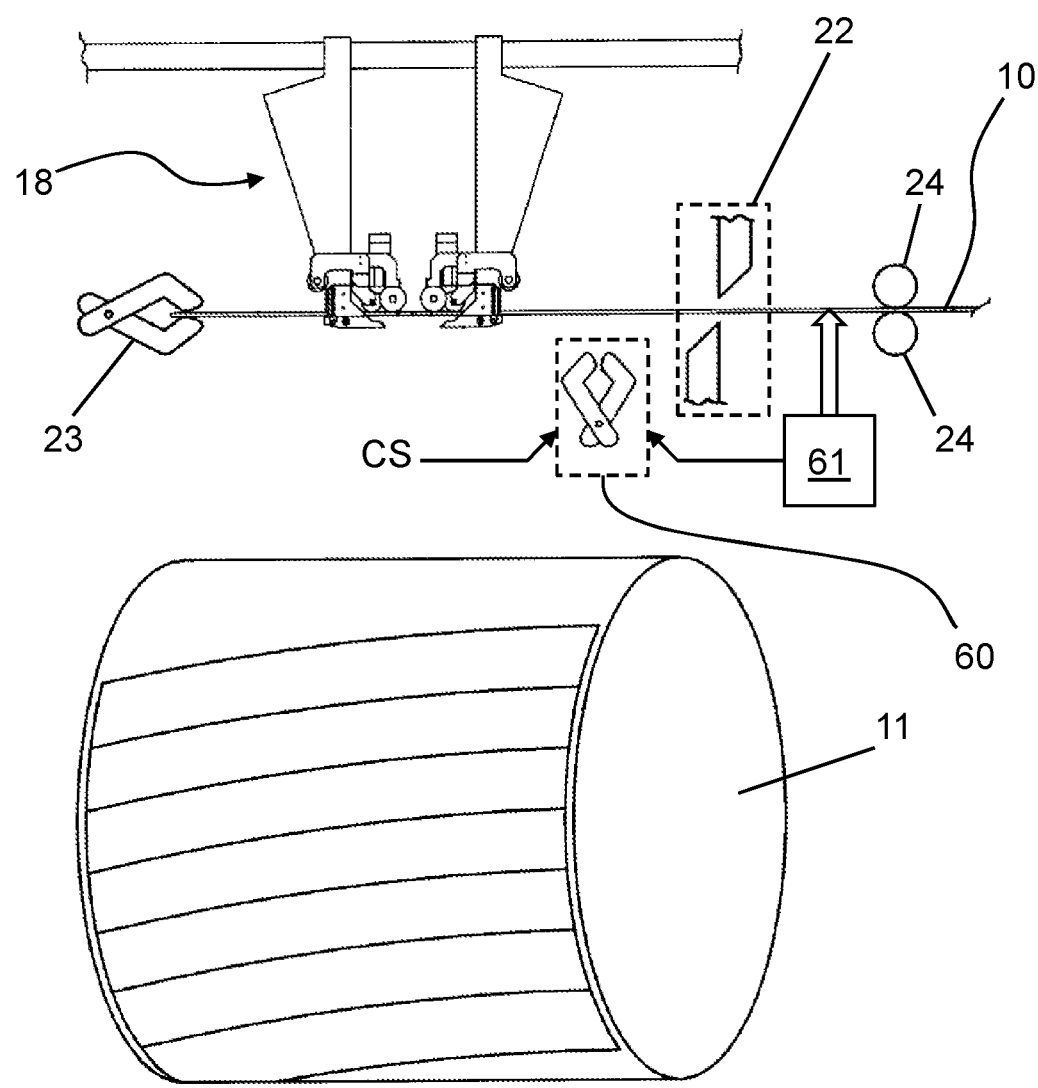

In FIGS. 5a-5b, reference numeral 24 indicates a pair of guide rollers operating on the semifinished product 10 in a zone immediately upstream of the cutting member 22.

Preferably, the building station 30 also comprises a deposition unit 18, mounted at the forming drum 11.

The deposition unit 18 is adapted for applying the strip-like elements onto the forming drum 11 during the rotation of the latter.

In particular, the forming drum 11 is made to rotate in steps and, after each rotation step, the deposition unit 18 applies a strip-like element.

Preferably, the deposition unit 18 is mobile between a position away from the drum 11, corresponding to the first work position of the gripping member 23, and a position close to the drum 11, corresponding to the second work position of the gripping member 23. When it is in the position close to the drum 11, the deposition unit 18 operates on the strip-like element as soon as it is cut to deposit it on the drum 11.

Preferably, the building station 30 also comprises a discard device 60 suitable for discarding one or more portions of the semifinished product 10 in certain situations that will be described better hereinafter.

As an example, the discard device 60 (FIG. 5b) can be made as a gripping element (e.g. a gripper) suitable for picking up a given portion of semifinished product 10 and moving it into a discard region, after it has been separated from the rest of the semifinished product 10 through the cutting member 22.

Preferably, the discard device 60 can be slaved to a sensor 61 suitable for detecting the presence of joints in the semifinished product 10.

Such a sensor 61, in particular, can, in a per se known way, detect the thickness of the semifinished product 10, in a direction substantially perpendicular to the planar extension of the semifinished product 10 itself, and preferably according to a plane substantially perpendicular to the longitudinal extension of the semifinished product 10. If the thickness of the semifinished product 10 is greater than a certain threshold means that the semifinished product itself is joined and the discarding of the portion of semifinished product or strip-like element comprising the joint, through the discard device 60, is thus commanded.

Before being supplied into the building station 30, the semifinished product 10 is accumulated in a suitable accumulation station 50, advantageously used to manage the processing time of the plant and the synchronisation between the various stations.

The unwinding of the semifinished product 10 from the reel 20 and the movement thereof towards the building station 30 take place by means of one or more suitable actuators 40, preferably of the electromechanical type, for example associated with one or more rollers, which contribute to defining the trajectory followed by the semifinished product 10.

As schematically shown in FIG. 1, the semifinished product 10 follows a path P from the reel 20 to the building station 30.

The apparatus 1 in accordance with the invention comprises a detection station 200.

The detection station 200 is configured to receive the semifinished product 10. Preferably, the semifinished product 10 is received by the accumulation station 50.

Preferably, the detection station is positioned upstream of the building station 30, according to the advancing direction of the semifinished product 10.

The detection station 200 is thus preferably interposed between the accumulation station 50 and the building station 30.

Advantageously, the acquisition zone AZ in which the detection station 200 operates is interposed between the accumulation station 50 and the building station 30.

The detection station 200 is configured to acquire characteristic parameters H, representative of the semifinished product 10, in particular of the portion of semifinished product framed in the acquisition zone AZ The apparatus 1 advantageously comprises a processing unit 160, suitable for detecting the presence of at least one defect of the semifinished product 10 as a function of the characteristic parameters H. As a function of the detection of the presence of such a defect, the processing unit 160 takes care of generating a corresponding notification signal NS.

In order to detect the defect, the processing unit 160 can use any suitable method.

Preferably, the acquisition of the characteristic parameters H comprises detecting a plurality of images representative of the semifinished product 10.

In order to detect the defect of the semifinished product 10, a comparison is made between said images and one or more reference parameters.

The notification signal NS is then generated as a function of such a comparison.

Preferably, the detection structure 200 comprises a first detection device 110 for detecting at least one first image A representative of the semifinished product 10.

Preferably, said first image A is a monochrome image.

The first detection device 110 can comprise a sensor or photosensitive element, capable of converting the light radiation receive into an electrical signal, and the circuitry necessary to make such an electrical signal able to be used by other devices/apparatuses, which will be described better hereinafter.

As an example the sensor can be of the CMOS type.

However, it is foreseen that other types of sensors can be used, nevertheless having suitable functional characteristics.

In an embodiment the first detection device 110 can comprise or be associated with a polarising filter.

Figure 6:
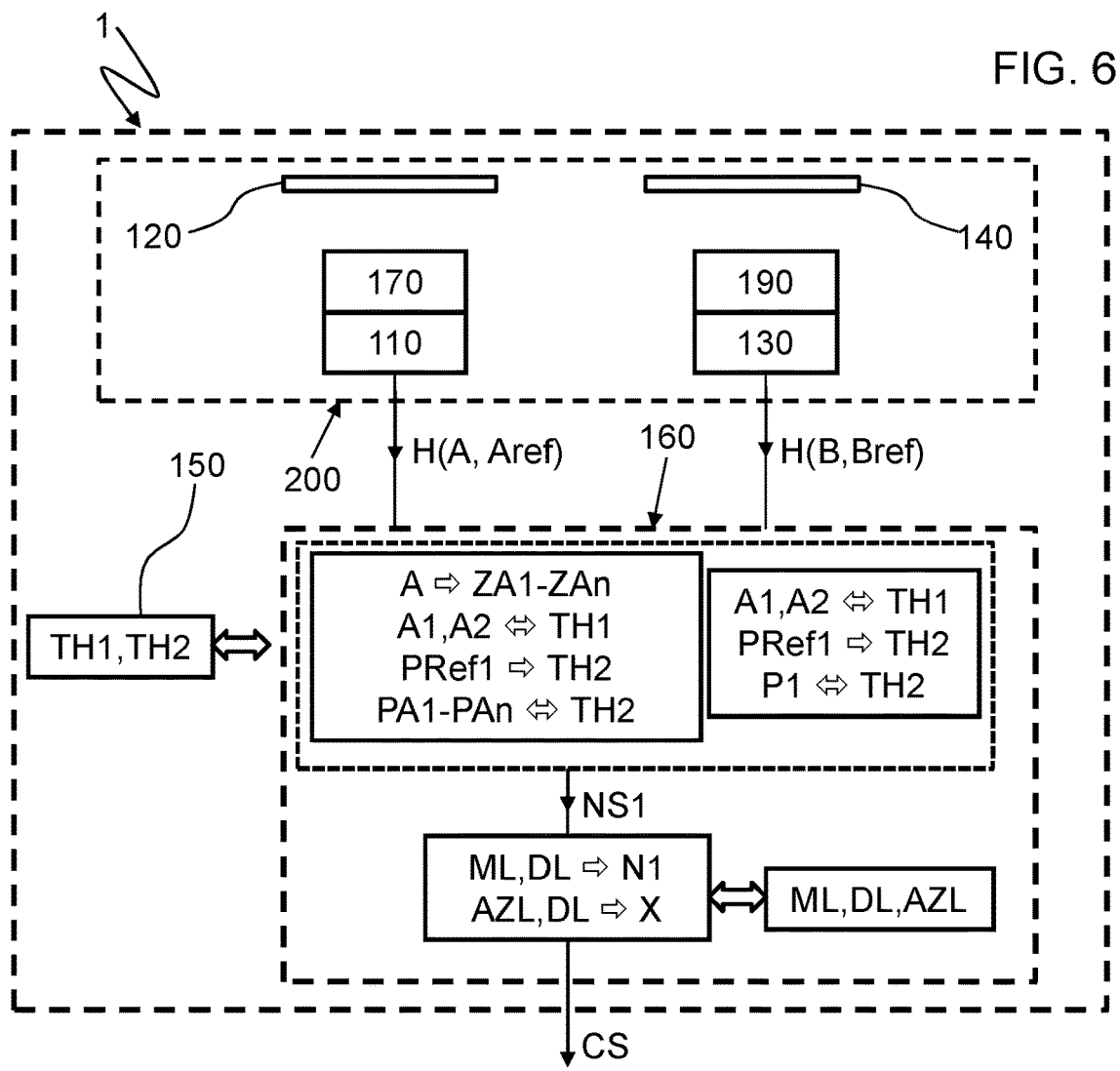
FIG. 6 shows a block diagram of the apparatus of FIG. 1.

The processing unit 160 is advantageously associated at least with the first detection device 110 and with a first memory 150 (FIGS. 1, 6).

In a first embodiment, the first image A is made up of a plurality of first portions A1, A2, each associated with a respective luminosity value (FIG. 3a).

Figure 2A:
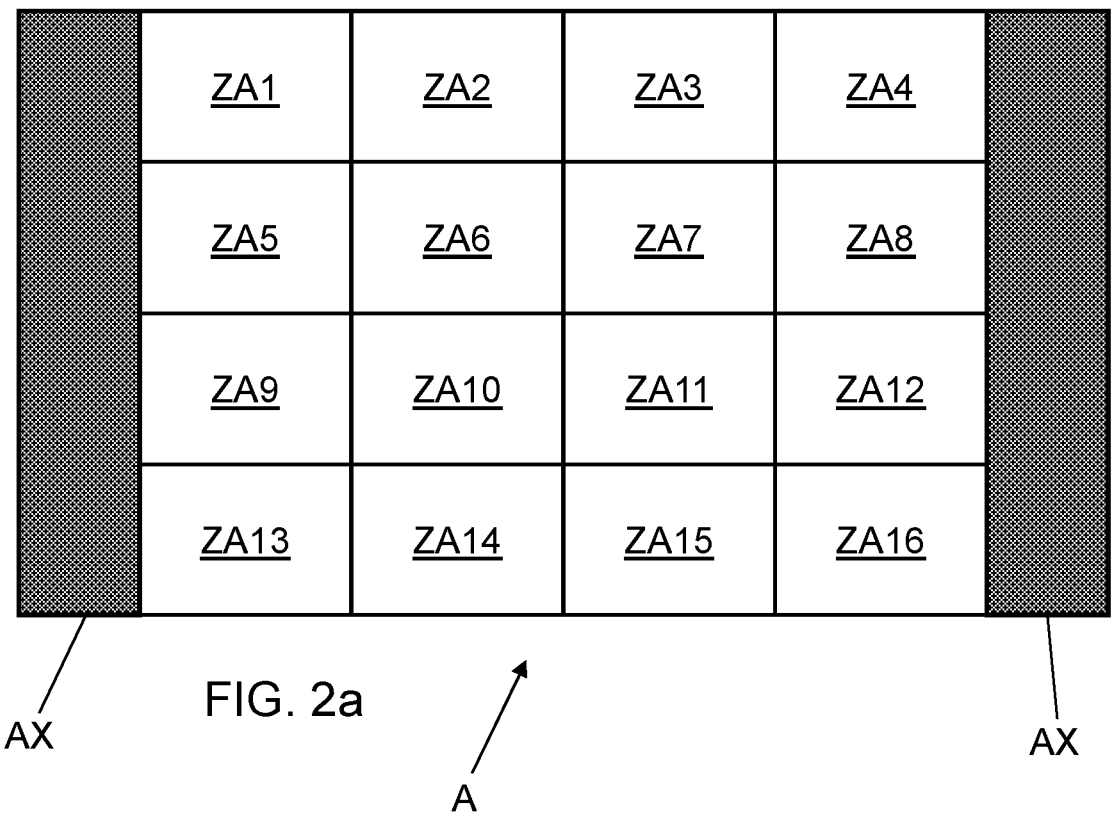

In a second embodiment, the processing unit 160 is configured to divide the first image A into a plurality of first sub-parts ZA1-ZAn (FIG. 2a).

Preferably, the first sub-parts ZA1-ZAn each have the same area.

As an example, the first image A can have a substantially rectangular perimeter; the first sub-parts ZA1-ZAn can, for example, be rectangular or square.

As an example, the first image A can be divided into nine or sixteen sub-parts. FIG. 2a shows an embodiment in which the first image A is divided into sixteen first sub-parts ZA1-ZAn.

Each first sub-part ZA1-ZAn is made up of a plurality of first portions A1, A2, each associated with a respective luminosity value (FIG. 3a).

Clearly, FIG. 3a represents, totally as a schematic example, any first sub-part ZA1-ZAn: each of the first sub-parts ZA1-ZAn can have portions/pixels having different luminosity with respect to the other first sub-parts.

In both of the embodiments, the first portions A1, A2 can consist of single pixels, or groups of pixels.

In the case in which each first portion A1, A2 consists of a single respective pixel, the luminosity value attributed to such a portion will be the luminosity value of the respective pixel.

In the case in which each portion A1, A2 comprises two or more pixels, the luminosity value associated with the portion A1, A2 will be determined as a function of the luminosity values of the various pixels of which the portion is made up.

The Applicant observes that the luminosity value of a pixel of an image is determined based on the number of photons that hit the corresponding pixel of the sensor forming part of the first detection device 110.

In particular, the greater the number of photons that hit a pixel of the sensor, the greater the luminosity value attributed to the corresponding pixel in the image will be.

It should be noted that each pixel of the sensor is capable of receiving a limited number of photons; this limit is set by the so-called capacity of the sensor.

If such a pixel receives a number of photons equal to or greater than said limited number, the luminosity value associated with such a pixel will be a maximum value, and it cannot increase even as the number of photons hitting increases.

In FIG. 3a, reference marks A1, A2 identify the pixels having luminosity values that are different from each other.

Preferably, the apparatus 1 also comprises a first memory 150 in which a first threshold TH1 for said luminosity values is stored.

Figure 7A:
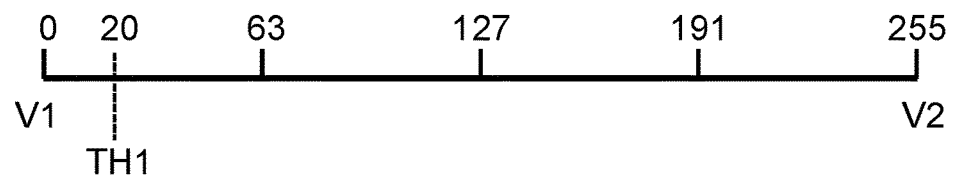
FIGS. 7a, 7b show some parameters that can be used in the apparatus and in the method in accordance with the invention.

The first threshold TH1 is defined inside a first linear scale of luminosity values (FIG. 7a).

The first scale is comprised between a first value V1 and a second value V2.

The first value V1 corresponds to a zero luminosity value; preferably the first value V1 coincides with said zero luminosity value.

The second value V2 corresponds to a maximum luminosity value; preferably the second value V2 coincides with said maximum luminosity value.

The absolute value of the difference between the first value V1 and the second value V2 defines the size of the first scale.

The absolute value of the difference between the first threshold TH1 and the first value V1 is comprised between about 5% and about 20% of the size of the first scale.

FIG. 7a schematically shows a first scale of luminosity values, in which the first value V1 is equal to zero, the second value V2 is equal to 255 and the first threshold TH1 is set for example equal to 20.

In FIG. 3a the reference mark A1 identifies the pixels having luminosity values lower than the first threshold TH1, whereas the reference mark A2 identifies the pixels having luminosity values higher than the first threshold TH1.

It should be noted that, in FIG. 3a, the reference mark A1 has been associated only with some pixels for the sake of simplicity; reference mark A1 is meant to identify all of the pixels or groups of pixels associated with luminosity values lower than the first threshold TH1.

Figure 4A:
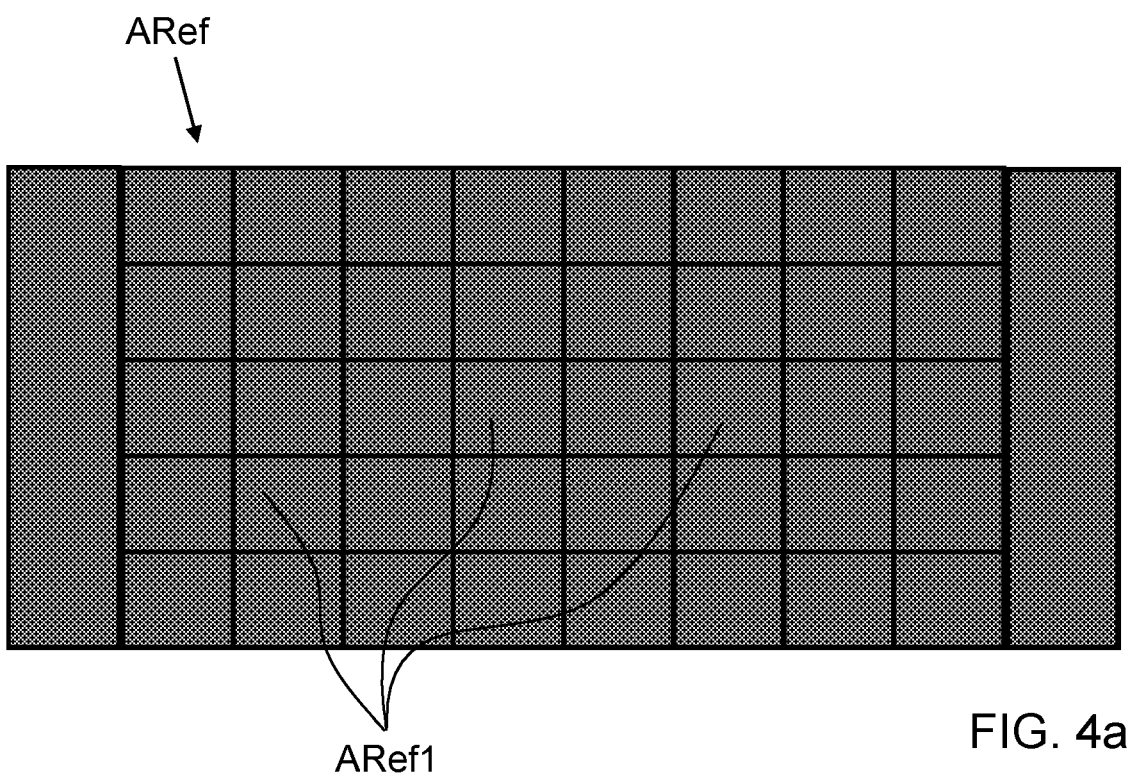

In particular, it is possible to provide a first reference image ARef (FIG. 4a), representative at least of a portion of semifinished product 10 substantially without residues or foreign bodies.

The first reference image ARef can be created artificially, for example through software programmes graphical processing software programmes, or it can be detected through the first detection device 110. In this second case, a portion of semifinished product that is totally free from residues or foreign bodies is accurately selected.

The first reference image ARef comprises a plurality of first reference portions ARef1.

Preferably, each first reference portion ARef1 has the same area.

Each first reference portion ARef1 is associated with a respective luminosity value.

Advantageously, the luminosity value of each of the first reference portions ARef1 is compared with the first threshold TH1.

Through such a comparison a first reference parameter PRef1, representative of the total area occupied, is determined in the first reference image ARef, from the first reference portions ARef1 associated with a luminosity value smaller than the first threshold TH1.

Based on the first reference parameter PRef1 the second threshold TH2 can thus be determined.

In practical terms, the first reference parameter PRef1 represents how large the area occupied by dark pixels must be in the case of an ideal or in any case optimal portion of semifinished product.

By calculating the ratio between such an area and the total area of the first reference image ARef, it is thus possible to determine the optimal percentage of dark pixels in the first image A. As a function of such a percentage it is finally possible to determine the second threshold TH2, taking into account the minimum dimensions of the defects that must be detected.

As an example, the second threshold TH2 can be to some extent smaller than the optimal percentage identified based on the first reference parameter PRef1, in order to prevent possible non-ideal circumstances and imperfections of the system, or simply small zones with higher luminosity than the average, in any case not influencing the quality of the semifinished product, being able to distort the results of the analyses carried out by the apparatus 1.

It should be noted that, preferably, the first reference image ARef and the first image A have the same dimensions, and the semifinished product 10 is represented in the two images with the same proportions, for example according to the same reduction or enlargement scale.

As an example, in the case in which the first reference image ARef is detected through the first detection device 110, the latter is positioned a distance from the semifinished product equal to the distance at which it is located when the same first detection device 110 detects the first image A. The optics of the first detection device 110 are preferably configured identically in the two cases, so as not to introduce dishomogeneity in terms of enlargement/reduction of the semifinished product represented. In the first embodiment, the processing unit 160 is configured to make a first comparison between the luminosity values associated with the portions A1, A2 of the first image A and the first threshold TH1.

As a function of such a first comparison, the processing unit 160 is configured to determine a first operative parameter P1 representative of a total area occupied in the first image A by the first portions A1 associated with a luminosity value lower or higher than the first threshold TH1, preferably lower than the aforementioned first threshold TH1.

In practical terms, the first operative parameter P1 expresses to what extent dark zones are present in the first image A.

The processing unit 160 is configured to compare the first operative parameter P1 with a second threshold TH2.

Preferably, the second threshold TH2 is representative of the minimum acceptable total area occupied by the portions of first image A having luminosity lower than the first threshold TH1.

As an example, the second threshold TH2 can be defined in terms of percentage ratio between the area occupied by the sufficiently dark pixels (i.e. having luminosity lower than the first threshold TH1) and the total area of the first image A.

The second threshold TH2 is suitably set as a function of the dimensions of the first image A and of the part of first image A occupied by the representation of the semifinished product 10.

By positioning the first detection device 110 at a distance comprised between about 100 mm and about 300 mm from the semifinished product 10, the second threshold TH2 can, for example, be comprised between about 85% and about 95%.

In an embodiment the second threshold TH2 can be determined in an at least partially automated manner.

As stated, the processing unit 160 is configured to compare the first operative parameter P1 with the second threshold TH2.

As a function of said comparison the processing unit 160 takes care of causing the generation of a notification signal NS.

Preferably, the processing unit 160 takes care of causing the generation of a notification signal NS if the first operative parameter P1 is lower than the second threshold TH2.

In practice, the fact that the first image A does not have an overall dark area that is sufficiently large is attributed to the presence of a defect, and the notification signal NS is consequently generated.

In the second embodiment, the processing unit 160 is configured to make a first comparison between the luminosity values associated with the portions A1, A2 of each of the first sub-parts ZA1-ZAn and the first threshold TH1.

In this second embodiment, the processing unit 160 performs the same operations carried out on the entire first image A in the first embodiment on each of the first sub-parts ZA1-ZAn.

In particular, as a function of such a first comparison, for each first sub-part ZA1-ZAn, the processing unit 160 is configured to determine a first operative parameter PA1-PAn representative of a total area occupied in each first sub-part ZA1-ZAn by the first portions A1 associated with a luminosity value lower or higher than the first threshold TH1, preferably lower than the aforementioned first threshold TH1.

The first parameters PA1-PAn thus undergo a processing analogous to the aforementioned first operative parameter P1 so as to identify whether, in one or more of the first sub-parts ZA1-ZAn, there is a defect.

Preferably, the detection station 200 also comprises at least one first emitter device 170, positioned on the same side as the semifinished product 10 with respect to the first detection device 110.

As schematically shown in FIG. 1, the first detection device 110 and the first emitter device 170 face a first surface 10a of the semifinished product 10.

The first emitter device 170 is configured to send electromagnetic radiation at least onto the semifinished product 10 to allow or promote the detection carried out by the first detection device 110.

Preferably, the radiation emitted by the first emitter device 170 is light radiation in the visible spectrum, for example obtained through one or more emitters suitably configured and powered.

Preferably, in order to maximise the quality of the detection carried out by the first detection device 110, the detection station 200 comprises at least one first back wall 120 positioned on the opposite side of the semifinished product 10 with respect to the first detection device 110. In other words, the semifinished product 10 is interposed between the first detection device 110 and the first back wall 120.

In the first embodiment, the first back wall 120 has the task of facilitating the detection of the first image A; in particular, the first back wall 120 is such that the portions AX of the first image A that reproduce the first back wall 120 itself are associated with luminosity values higher than the first threshold TH1. In this way the first back wall 120 provides a determined contrast for the identification of the first portions A1.

In the second embodiment, the first back wall 120 has the task of making the detection of the first image A and the subsequent processing aimed at identifying possible defects more reliable; in particular, the first back wall 120 is such that the portions AX of the first image A that reproduce the first back wall 120 itself are associated with luminosity values lower than the first threshold TH1. In this way, it is possible to correctly detect even residues of service fabric that have only a small part in contact with the semifinished product, and which project laterally from it. Thanks to the contrast provided by the dark colour of the first back wall 120, such residues can be suitably identified.

Moreover, the fact that the first back wall 120 is dark in colour prevents small variations in width of the semifinished product 10 being able to interfere with a correct calculation of the size of the "light" portions in the images detected.

In practical terms, the first emitter device 170 illuminates the portion of semifinished product 10 that must be detected by the first detection device 110, and possibly the first back wall 120 (if present). The first detection device 110 thus detects the corresponding reflected radiation, so as to define the first image A.

The detection method described up to now, in the two embodiments, preferably operates only on one face of the semifinished product 10, i.e. on the first surface 10*a*.

Preferably, the method is applied in an analogous manner also on the second surface 10*b*, so as to detect possible defects present on the second surface 10*b* itself.

For this purpose, the detection station 200 can comprise a second detection device 130, and a second emitter device 190.

A second back wall 140 can also be provided, positioned on the opposite side of the semifinished product 10 with respect to the second emitter device 190.

Figure 2B:
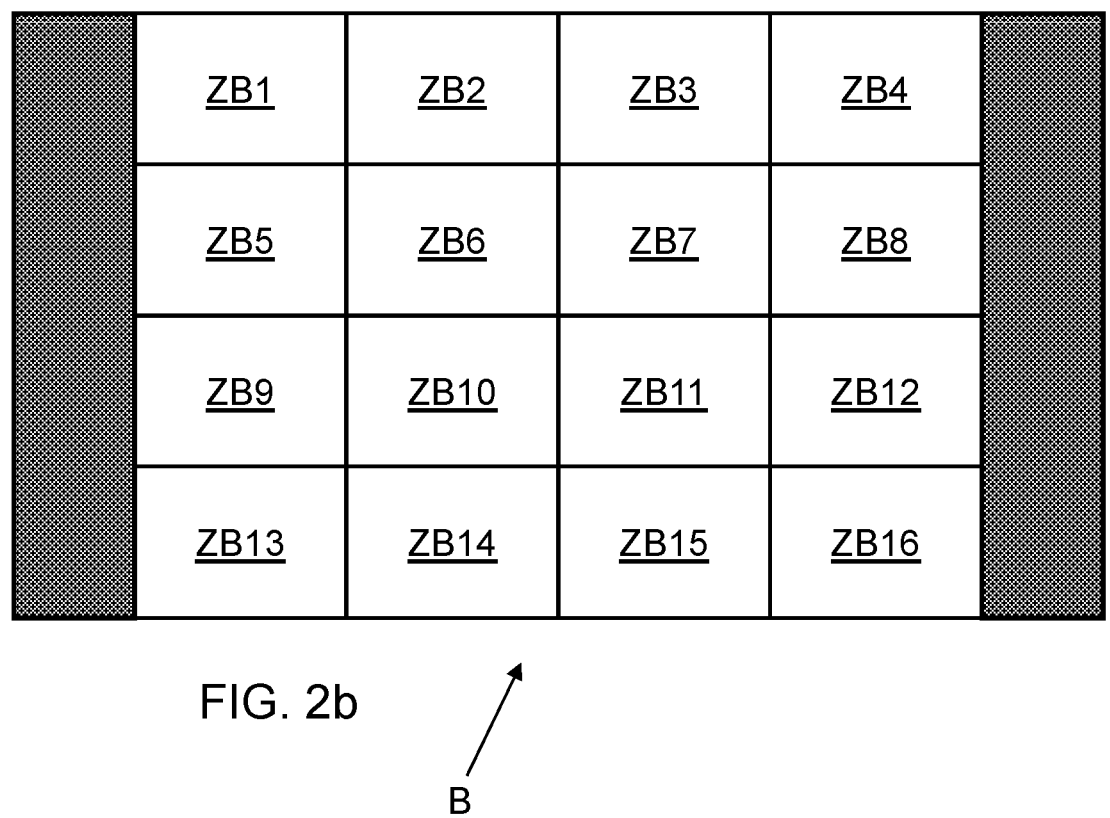

The second detection device 130 detects one or more second images B (FIGS. 2*b*, 3*b*).

The second images B can be divided into a plurality of second sub-parts ZB1-ZBn.

The second images B, and/or the respective second sub-parts ZB1-ZBn, are formed by a plurality of second portions B1, B2.

Each second portion B1, B2 is associated with a respective luminosity value.

Figure 7B:
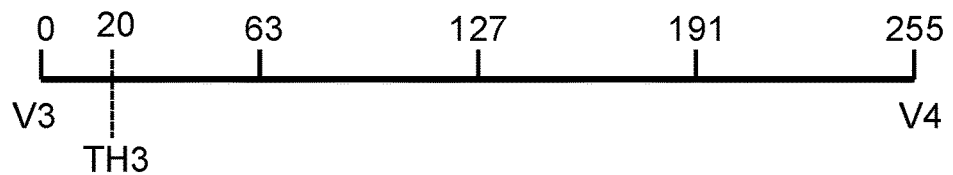

Such a luminosity value is compared with a third threshold TH3 (FIG. 7*b*), totally analogous to the aforementioned first threshold TH1.

Once, in each second image B and/or in each second sub-part ZB1-ZBn, the area occupied by the portions that are too light or too dark have been identified, such an area is compared with a fourth threshold TH4, analogous to the aforementioned second threshold TH2.

As a function of this comparison, the notification signal NS can be generated.

Figure 4B:
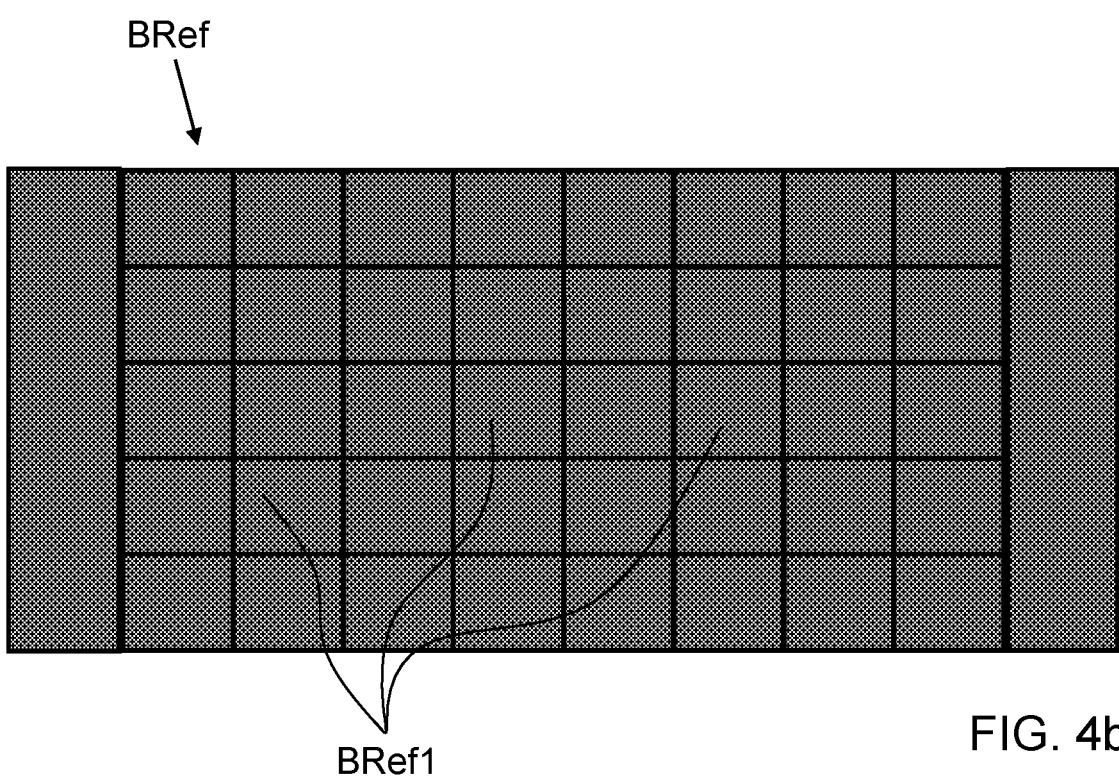

The fourth threshold TH4 can be determined based on a second reference image BRef (FIG. 4*b*), formed from a plurality of reference portions BRef1, and on a second reference parameter PRef2, obtained by comparing such an image with the third threshold TH3.

As stated, the processing unit 160 is configured to generate the notification signal NS, representative of the fact that a defect of the semifinished product 10 has been identified.

In light of what has been described above, it is possible for two mutually independent notification signals NS to be generated, one relative to the first surface 10*a* of the semifinished product 10 and one relative to the second surface 10*b* of the semifinished product 10 itself.

In accordance with the invention, the processing unit 160 is also suitable for activating, as a function of the notification signal NS, the discard device 60, so that the latter discards at least a portion of the semifinished product 10 comprising said defect.

In a preferred embodiment, the discard device 60 can thus be activated substantially in two circumstances: detection of a joint by the sensor 61 and detection of a defect by the detection station 200.

In both cases, the discard device 60 intervenes on the semifinished product 10 to eliminate a portion thereof and prevent it being able to be used to build the tyre.

It should be noted that, in an embodiment, it is foreseen that two different discard members can be used, one slaved to the sensor 61 and one slaved to the detection station 200.

The Applicant, however, considers it advantageous to use a single discard member, so as to make the structure of the plant simpler and more cost-effective.

In a further embodiment, it is foreseen for the sensor 61 not to be present or not to be used; in this case, the discard device 60 is slaved only to the detection station 200.

Preferably, the portion of semifinished product 10 that must be discarded, in the case of detection of a defect by the detection station 200, is determined as a function of a main length ML of the semifinished product 10.

Preferably, the portion of semifinished product 10 to be discarded comprises one or more strip-like elements.

In this case, said one or more strip-like elements to be discarded are preferably identified as a function of the main length ML and the length of the strip-like elements themselves, i.e. the aforementioned determined length DL.

Preferably, the processing unit 160 is configured to calculate the integer number N1 defined by the integer part of the result of the division between the main length ML and the determined length DL.

In this way it is substantially calculated how many strip-like elements must be cut and deposited before the strip-like element(s) present in the acquisition zone AZ is/are cut, i.e. the strip-like element(s) on which it is possible that there is the detected defect.

Therefore, from when the notification signal NS is generated, i.e. from the moment when the defect of the semifinished product 10 is detected, there is a wait for the building station 30 to lay a number N of strip-like elements equal to said integer number N1.

The N strip-like elements cut and laid are formed from the part of semifinished product 10 on which the main length ML is defined, i.e. by the part of semifinished product 10 comprised between the cutting point CP and the acquisition zone AZ (in particular the proximal end PE of the latter). Given that, in such a part, defects have not been previously detected, the strip-like elements formed from it are regularly laid.

After the N-th strip-like element has been laid, a command signal CS is sent to the discard device 60 so that it discards at least one strip-like element following said N strip-like elements.

Preferably, the command signal CS is configured to cause the elimination of the strip-like element immediately following said N strip-like elements. Preferably, the command signal CS is configured to cause the elimination of the two strip-like elements immediately following said N strip-like elements. In this case, the command CS is preferably repeated, so as to actuate the discard device 60 twice—once for each strip-like element to be discarded.

The Applicant considers that, in this way, even almost certainly discarding one strip-like element that may be free from defects, there is nevertheless reasonable certainty of eliminating the strip-like element that has the detected defect.

In this respect, let us consider the example schematised in FIG. 8*a*.

B0 indicates the strip-like element that is about to be cut, or has just been cut, in the building station 30.

B1-B5 are the whole strip-like elements that can be formed from the part of semifinished product 10 comprised between the cutting point CP and the proximal end PE of the acquisition zone AZ. Thus, in this example, the value of N1 is equal to 5.

If the presence of a defect of the semifinished product 10 is identified in the acquisition zone AZ, such a defect can (in the discrete representation schematised in FIG. 8a) be in one of the positions a-d.

If the defect was in position a, the strip-like element to be discarded would be the (N+1)-th, i.e. in this example the sixth.

If the defect was in one of the positions b-d, the strip-like element to be discarded would be the (N+2)-th, i.e. in this example the seventh.

Preferably, the detection structure 200 and the processing unit 160 do not generate detailed information relating to the position of the defect inside the acquisition zone AZ; it is thus suitable to discard all of the potentially defective strip-like elements, i.e. the (N+1)-th strip-like element and the (N+2)-th strip-like element.

In more general terms, the number X of strip-like elements to be discarded can depend on the length AZL of the acquisition zone AZ.

If the length AZL is substantially equal to the determined length DL, then the situation schematically represented in FIG. 8a is verified. In practical terms, the acquisition zone AZ, at each moment, frames at most two strip-like elements. Therefore, there are two strip-like elements that are discarded upon detection of a defect.

If, on the other hand, the length AZL of the acquisition zone AZ was substantially greater than the determined length DL, then in the acquisition zone AZ even three potential strip-like elements could be framed.

This situation is schematically represented in FIG. 8b. With respect to FIG. 8a, the length AZL of the acquisition zone AZ is increased. As can be noted, there are three strip-like elements potentially having a defect detected in the acquisition zone AZ:

the (N+1)-th strip-like element, in the case in which the defect is in position a;

the (N+2)-th strip-like element, in the case in which the defect is in one of the positions b-e;

the (N+3)-th strip-like element, in the case in which the defect is in position f.

The processing unit 160 is thus preferably configured to determine the number X of strip-like elements to be discarded as a function of the length AZL of the acquisition zone AZ and of the determined length DL of the strip-like elements, so as to generate a suitable command signal CS.

As stated, the acquisition and analysis for the detection of possible defects are carried out on both the first and the second surface 10a, 10b of the semifinished product 10; it is thus possible for two mutually independent notification signals NS to be generated, each relative to a respective surface 10a, 10b.

The processing unit 160 is advantageously configured to manage this situation so as to suitably discard the potentially defective strip-like elements.

In particular, since the acquisition zone of the first surface 10a is preferably a different distance from the building station 30 with respect to the acquisition zone of the second surface 10b, the processing unit 160 will advantageously take into account different main lengths, suitably pre-stored.

The command signal CS will finally be generated whenever one or more strip-like elements have to be discarded, as a function of the acquisition and processing carried out with reference to the first surface 10a and/or to the second surface 10b of the semifinished product 10.

In other words, it will be sufficient for only one of the surfaces 10a, 10b of the semifinished product 10 to have a defect in order for the command signal CS to be generated.

It should be noted that the processing unit 160 described up to now can be made as a single electronic device, or it can comprise different devices that are separate from one another: for example, a first device can be associated with the detection station 200 for generating the notification signal NS, and a second device, physically separate from the first and forming part, for example, of a PLC that manages the entire plant, can be responsible for generating the command signal CS intended for the discard device 60.

It should also be noted that the processing unit 160 is advantageously in data connection with the building station 30; in particular, information relative to the cutting and to the deposition of the strip-like elements are preferably made available to the processing unit 160, so as to be able to generate the command signal CS at the suitable moment. As stated, at least one part of the processing unit 160 can be integrated in the PLC that manages the entire process; in this way, the information relative to the building station 30 can be recovered in a very simple manner.

With reference to the data used by the processing unit 160 to generate the command signal CS, a suitable interface (not illustrated) is provided through which the main length ML, the determined length DL and preferably the length AZL of the acquisition zone AZ are inserted. Such insertion can take place manually, by a worker and/or in an at least partially automated manner, transferring the data in question from an apparatus outside of the processing unit 160 through said interface.

The invention claimed is:

1. A method for controlling the feed of semi-finished products comprising:

advancing a semi-finished product from a reel along a path into a building station configured to build one or more structural components of a tyre from said semi-finished product;

acquiring, in an acquisition zone located on said path, at least one characteristic parameter of the semi-finished product as the semi-finished product is fed into the building station;

detecting from the at least one characteristic parameter of the semi-finished product the presence of at least one defect;

with the detection of the at least one defect, generating a notification signal; and with the generation of the notification signal, discarding a portion of the semi-finished product comprising the at least one defect by a discard device, wherein the building station comprises a cutting member, the cutting member cuts a portion of the semi-finished product comprising the at least one defect along a main length of the semi-finished product, wherein the cutting member further cuts the semi-finished product into one or more strip-like elements of a determined length, and wherein the one or more strip-like element comprises the at least one defect portion defined as a function of the main length and the determined length, wherein discarding a portion of the semi-finished product comprises:
calculating an integer number of the result of the division between the main length and the determined length;
starting when the notification signal is generated and waiting until the building station has laid a number N of strip-like elements equal to the integer number; and
sending a command signal to the discard device for discarding the at least one strip-like element following the N strip-like elements.

2. The method according to claim 1, wherein the command signal causes at least one of the strip-like elements immediately following the N bands to be discarded by the discard device.

3. The method according to claim 1, wherein the command signal causes at least two strip-like elements immediately following the N bands to be discarded by the discard device.

4. The method according to claim 1, wherein the step of acquiring comprises taking a plurality of images of the semi-finished product, and wherein the step of detecting comprises making a comparison between the images and one or more reference parameters and generating the notification signal from the comparison.

5. The method according to claim 1, wherein the discard device is arranged in line with the building station.

6. A method for controlling the feed of semi-finished products comprising:
advancing a semi-finished product from a reel along a path into a building station configured to build one or more structural components of a tyre from said semi-finished product;
acquiring, in an acquisition zone located on said path, at least one characteristic parameter of the semi-finished product as the semi-finished product is fed into the building station;
detecting from the at least one characteristic parameter of the semi-finished product the presence of at least one defect;
with the detection of the at least one defect, generating a notification signal; and
with the generation of the notification signal, discarding a portion of the semi-finished product comprising the at least one defect by a discard device,
wherein the acquisition zone is between an accumulation station and the building station, the accumulation station accumulates the semi-finished products, and wherein the step of feeding comprises feeding the semi-finished product from the accumulation station.

7. The method according to claim 6, wherein the building station comprises a cutting member, the cutting member cuts a portion of the semi-finished product comprising the at least one defect along a main length of the semi-finished product.

8. The method according to claim 7, wherein the cutting member further cuts the semi-finished product into one or more strip-like elements of a determined length, and wherein the one or more strip-like element comprises the at least one defect portion defined as a function of the main length and the determined length.

9. The method according to claim 8, wherein discarding a portion of the semi-finished product comprises:
calculating an integer number of the result of the division between the main length and the determined length;
starting when the notification signal is generated and waiting until the building station has laid a number N of strip-like elements equal to the integer number; and
sending a command signal to the discard device for discarding the at least one strip-like element following the N strip-like elements.

10. The method according to claim 9, wherein the command signal causes at least one of the strip-like elements immediately following the N bands to be discarded by the discard device.

11. The method according to claim 9, wherein the command signal causes at least two strip-like elements immediately following the N bands to be discarded by the discard device.

12. The method according to claim 6, wherein the step of acquiring comprises taking a plurality of images of the semi-finished product, and wherein the step of detecting comprises making a comparison between the images and one or more reference parameters and generating the notification signal from the comparison.

13. The method according to claim 6, wherein the discard device is arranged in line with the building station.

* * * * *